(12) United States Patent
Li et al.

(10) Patent No.: US 8,037,351 B2
(45) Date of Patent: Oct. 11, 2011

(54) APPARATUS AND METHODS FOR RESTORING SYSTEM OPERATION STATES

(75) Inventors: Li Li, Milpitas, CA (US); Jin Guo, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 341 days.

(21) Appl. No.: 12/103,066

(22) Filed: Apr. 15, 2008

(65) Prior Publication Data
US 2009/0259886 A1 Oct. 15, 2009

(51) Int. Cl.
*G06F 11/00* (2006.01)
(52) U.S. Cl. ........................................ 714/15
(58) Field of Classification Search .............. 714/15, 714/13
See application file for complete search history.

(56) References Cited

U.S. PATENT DOCUMENTS

| 4,831,524 | A  | * | 5/1989 | Furgerson | 716/11 |
| 7,242,974 | B2 |   | 7/2007 | Ko et al. | |
| 7,397,464 | B1 | * | 7/2008 | Robbins et al. | 345/173 |
| 2002/0099787 | A1 | * | 7/2002 | Bonner et al. | 709/216 |
| 2005/0049011 | A1 |   | 3/2005 | Ko et al. | |
| 2005/0125083 | A1 | * | 6/2005 | Kiko | 700/19 |
| 2005/0138311 | A1 |   | 6/2005 | Ko et al. | |
| 2006/0072369 | A1 | * | 4/2006 | Madter et al. | 365/232 |
| 2006/0080175 | A1 | * | 4/2006 | Rowe et al. | 705/14 |
| 2007/0016027 | A1 | * | 1/2007 | Marco et al. | 600/437 |
| 2007/0154009 | A1 | * | 7/2007 | Cameron et al. | 379/373.02 |
| 2009/0104954 | A1 | * | 4/2009 | Weber et al. | 463/1 |

FOREIGN PATENT DOCUMENTS
JP P2002-33824 1/2002

OTHER PUBLICATIONS

Atmel Power Management and Analog Companions (PMAAC) AT73C206 Power Management IC and Audio Codec, Aug. 12, 2007.

* cited by examiner

*Primary Examiner* — Scott Baderman
*Assistant Examiner* — Yair Leibovich
(74) *Attorney, Agent, or Firm* — Weiss & Arons LLP

(57) ABSTRACT

A process for restoring an operational state of a portable handheld device is provided. The device may include multiple computing units and persistent storage. The operational state may be generated by a sequence of events. The operational state may receive signals corresponding to a plurality of event types. The process may include selecting an event type for storage, storing in the persistent storage events corresponding to the selected event type, receiving a signal indicating an interruption of operation, and transmitting the stored events to restore the device to the operational state.

21 Claims, 3 Drawing Sheets

APPARATUS AND METHODS FOR RESTORING SYSTEM OPERATION STATES

BACKGROUND

The present invention relates generally to restoration of system operation states after a power supply interruption.

An increasing number of software applications are being made available to portable mobile devices. One of the key differentiating factors between applications is how to make the user experience more smooth and seamless. For example, when a user application is interrupted by a device failure, it would be very desirable to get it restored to the same operational state that the device was in prior to the device failure.

SUMMARY OF THE INVENTION

A system and/or method for restoration of system operation states after a power supply interruption, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
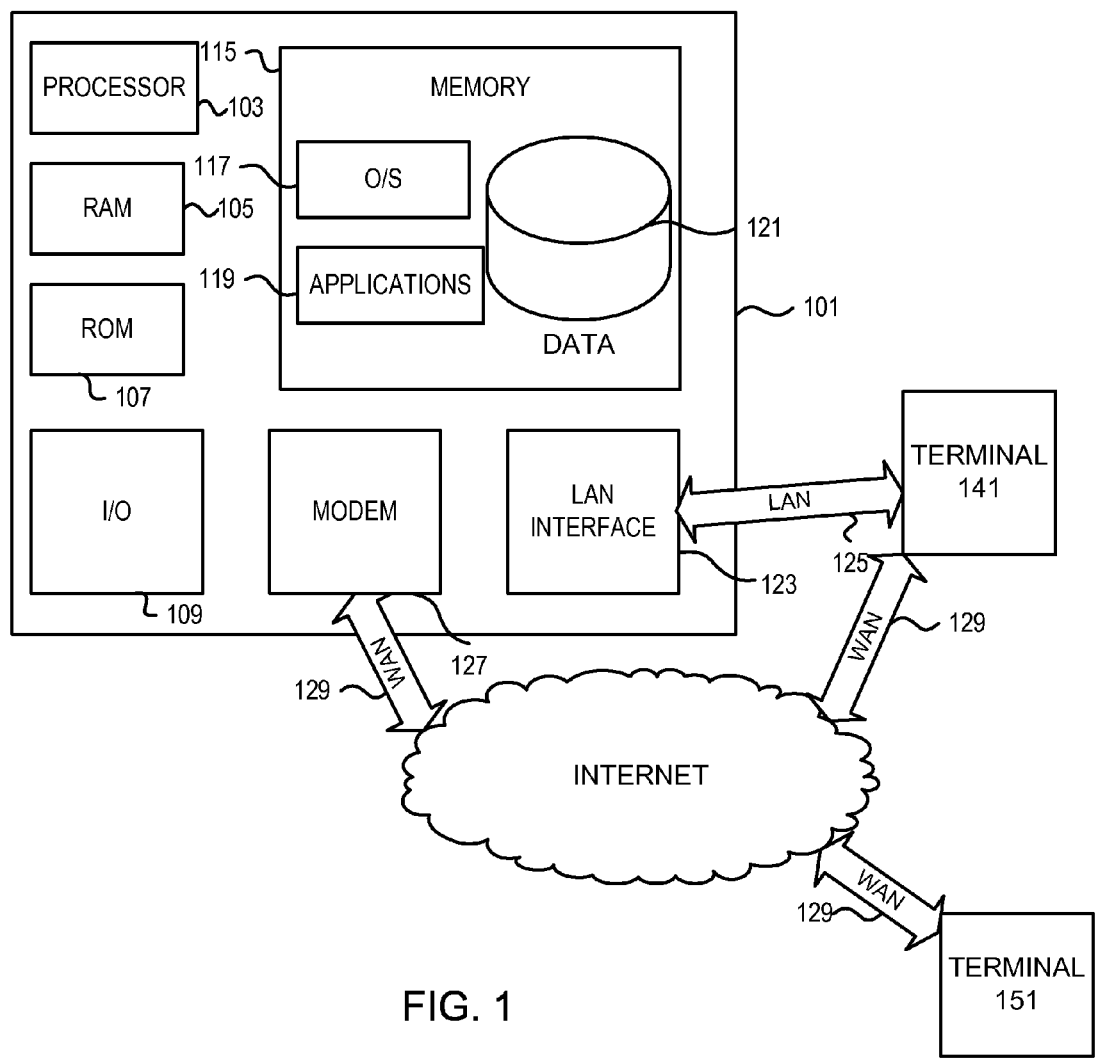
FIG. 1 illustrates a schematic diagram of a general-purpose digital computing environment in which one or more aspects of the present invention may be implemented.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

An embodiment of the present invention introduces a mechanism to recover the device to the operation state (possibly involving multiple user applications) preferably immediately prior to the interruption.

When a device experiences an operation interruption caused by a software or hardware reset, known methods (such as those used in Samsung F330 and F700 manufactured by Samsung of Seoul, South Korea) can restore the device to a default/idle state, but the user applications running prior to the interruption are lost. Specifically, for system failures (described alternatively herein as system "resets") caused by a software failure, a watchdog timeout (i.e., a timeout of the system caused by the elapsing of some preset, typically periodic, amount of time) a hardware reset, or any other suitable circumstance, certain commercially available devices can self-power up to an idle state following reset.

One example of the hardware reset described above is a short-term (typically within several hundred milliseconds) battery contact lost incident. Such an incident may occur upon a sudden impact or other jarring circumstance. Certain hardware components, such as a switching mode power supply, can be used to detect such battery failures (momentary battery contact loss followed by a re-connect within a predetermined amount of time, typically within hundreds of milliseconds). The hardware components may then auto-power up the phone. However, a major limitation in such a circumstance is that, after power interruption, these mobile devices can only get back to the idle screen (alternatively referred to as a "start-up" screen). In other words, the user applications that were running prior to the interruption are not recovered.

In one exemplary case, when the user is playing music on a mobile phone capable of playing MP3 files, a short-term battery contact loss can cause the phone to temporarily lose power and then auto-power (battery re-connect) back to the idle screen; but the music play is not restored. In such a case, the user will need to re-instruct the phone to play the previously-requested song again. A similar case may occur when a user is listening to FM stereo on his car radio when the user is driving.

With the mechanism according to an embodiment of the invention, the user applications can preferably be restored automatically, without the need for further user intervention. The following is a description of the operation of systems and methods according to the invention.

In order to understand the operation of the invention, a short introduction to event-driven software is helpful. Event-driven design has become mainstream software design methodology, especially for mobile applications. In event-driven software design, every device operation triggers a series of events. Typically, when the user selects a menu and presses a button on the screen of a mobile device, in order for the operation to move from one state to the other, operation-specific events are sent out to the responsible entity or module in the system to update the present state and synchronize the updated state with the rest of the system.

As additional background, it is important to note that one user application is usually associated with a hierarchy of events, as demonstrated below.

In view of the foregoing, the invention operates as follows. In the aforementioned music play interruption case: When the user selects an entertainment menu on the phone, an event (E1) is sent out (such as through broadcasting) from a central events manager within the computer system resident in the phone to an entertainment module within the computer system in order to enable a set of submenu options.

Next, the user may select music (E1_1) as the desired entertainment. Then, the user may select the style of the music (E1_2) and then possibly a favorite song from a playlist (E1_3); all steps of which are characterized by at least one event.

As long as these events are saved in persistent storage—i.e., a memory that can maintain data integrity through an OFF/ON power cycle, the events can be recovered after a power interruption. Consequently, these events can be automatically retrieved in the same order (E1, E1_1, E1_2 and E1_3) as they were originally submitted. Once retrieved in the proper order, these events can be re-broadcast out, thereby restoring the original operation states and user applications seamlessly to their final operational state prior to phone turn-OFF.

A similar embodiment of the invention can also be used to restore multiple/concurrent user applications as needed.

A process for restoring an operational state of a portable handheld device is provided. The device preferably includes persistent storage and is powered by a removable battery. The operational state preferably has been generated by a sequence of events.

The process according to the invention may include defining at least one event type. Once an event type is defined, the invention includes selecting the defined event type as one for which related events are stored. The process may further include storing in the persistent storage the events corresponding to the selected type. The process may also include receiving a signal indicating an interruption of operation and transmitting the stored events to restore the device to the operation state.

Certain event types according to the invention may include a session start event type, a session end event type, a major event type, and a minor event type. Major event types may include such events as a user request for a Universal Resource Locator ("U.R.L."), while minor events may include a user key-press or a menu pull-down instruction.

Transmitting the stored events may include broadcasting the events to multiple computing units within the device. The multiple computing units may be physically in one silicon die and logically connected through shared memory. The transmitting may also include broadcasting to multiple computing units that are logically connected through a shared bus.

Alternatively, the transmitting may include broadcasting to multiple computing units that are physically in multiple silicon dies, the dies being in a single IC package, but logically connected through shared memory. In certain embodiments of the invention, the dies may also be in a multiple IC packages.

The storing according to the invention may also include storing by operation of a centralized event handler.

In other embodiments of the invention, the operating state may include the operation of at least a first application and a second application. The sequence of events in such an embodiment may include a first subsequence corresponding to the first application and a second subsequence corresponding to the second application. Further, the first application may store the first subsequence in a first portion of the persistent storage and the second application may store the second subsequence in the second portion of the persistent storage.

In certain embodiments of the invention, the first and second portions of the persistent storage are physically separated from each other. Furthermore, the first and second portions of the persistent storage may be logically separated from each other. One additional embodiment of the invention may include, following the receiving of the interruption signal, returning the device to a pre-defined reference operation state.

The pre-defined reference operation state can be characterized by an event within the application-specific event sequence. For example, during certain implementations of the invention, to address the potential issue of limited storage space or performance concerns, only a portion of the event sequence may be stored and thus the last stored event can be a certain intermediate event instead of the last event prior to the power interruption. This ensures that at least an intermediate operation state can be restored later on. This predetermined intermediate event may be referred to herein as the pre-defined reference operation state.

One exemplary system according to the invention may perform as follows. When a user executes an event of type A, the device may enter its programmed operation state (such as displaying a known web page). Thereafter, the device may disconnect from, and then reconnect to, the device's battery in a predetermined time duration (such as 300 ms). Following a second predetermined time duration, the device may return back to the programmed operation state, followed immediately thereafter by a reprocessing of type A events. This process may be operational for a number of different types of events. The device uses the methods and approaches taught in this invention when there is at least one category of events that can be recreated following disconnecting from and reconnecting to the battery.

A system according to the invention may include a mechanism that can restore the full operation state, not just a partial or sub-state, which can improve usability. Furthermore, in preferred embodiments of the invention, the recovery is automatic—i.e., no user intervention is needed. Furthermore, such a system may reduce user operational overhead and improve the user experience.

An embodiment of the invention may also introduce a mechanism to restore the user applications through an operation interruption.

FIG. 1 illustrates a block diagram of a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide centralized storage.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Figure 2:
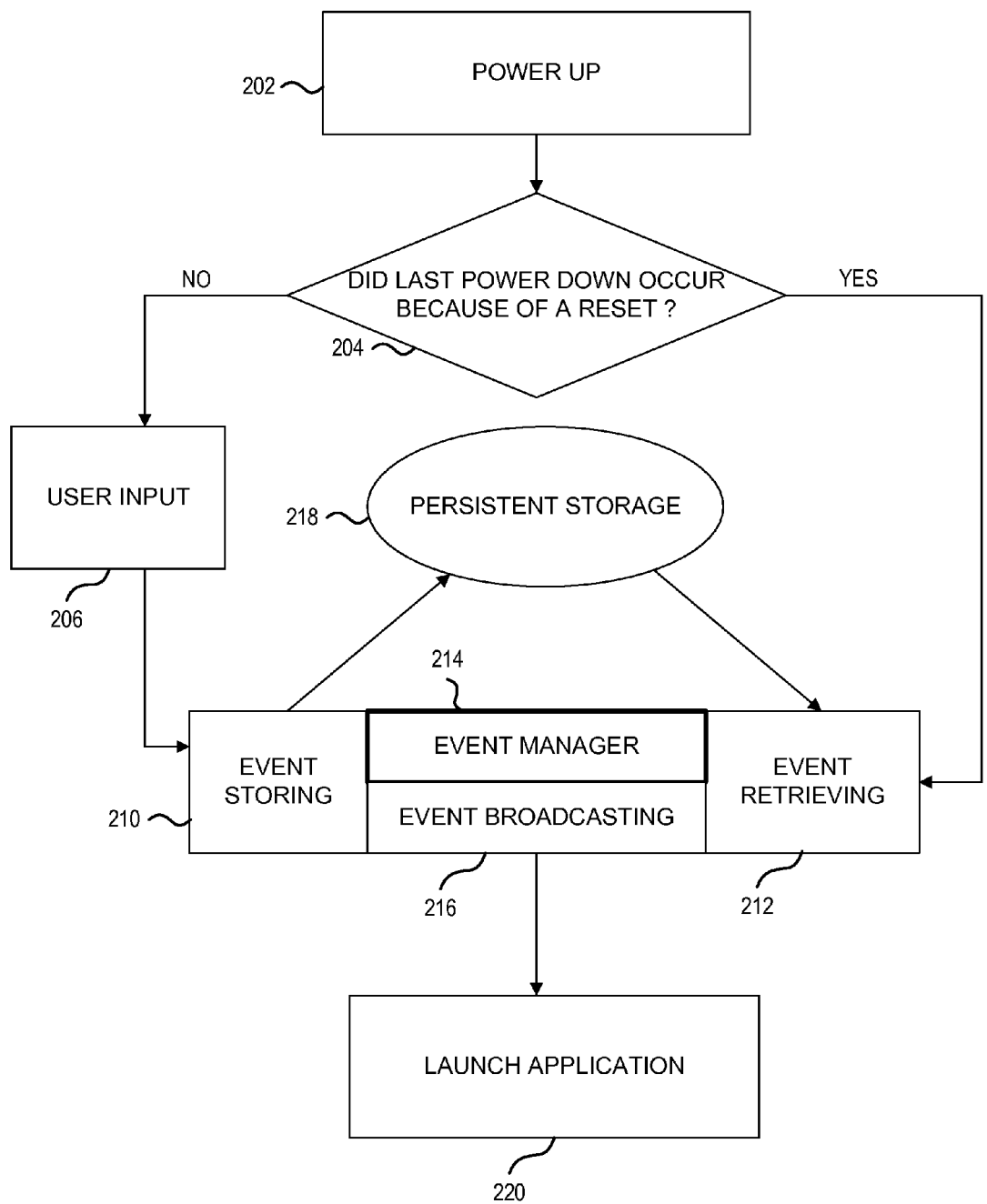
FIG. 2 is an illustrative flow diagram of a method according to the invention.

FIG. 2 shows an illustrative flow diagram of a method according to the invention. Step 202 shows a power up of the device. Step 204 queries whether the last power down of the device occurred because of a reset event.

Step 206 shows that, when the last power down did not occur because of a reset event, the method returns to receiving new user input, at 206, and storing the user input into event storing 210. At least a portion of the events in the event store are also transmitted by event manager 214 to persistent storage 218. Events are typically broadcast by event manager 214 using event broadcasting utility 216.

Step 212 shows that, when the last power down did occur because of a reset event, then the method may enter event retrieving 212. Event retrieving may preferably retrieve information stored in persistent storage 218 in order to rebuild the operational state that existed at the time of the reset event.

Figure 3:
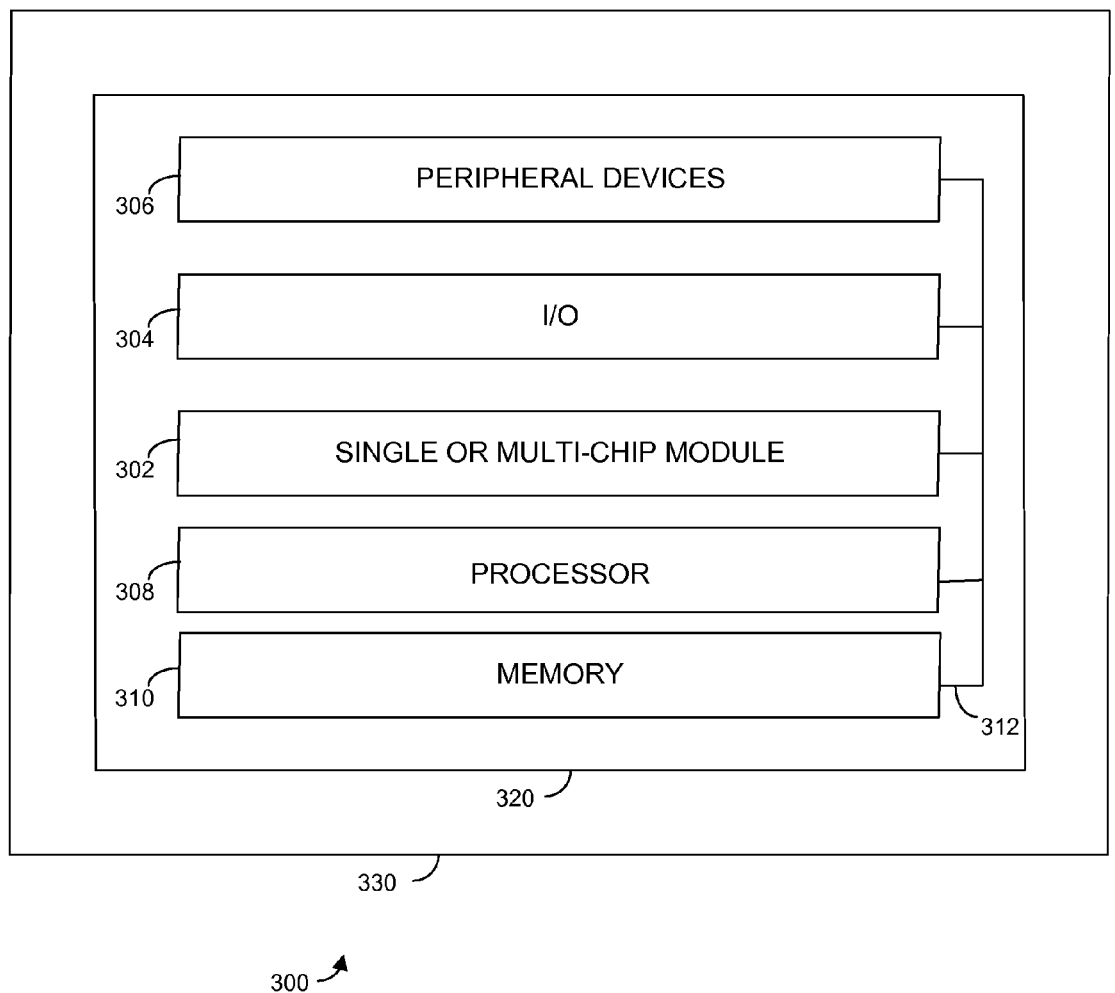
FIG. 3 is a schematic diagram of an illustrative single or multi-chip module of this invention in a data processing system.

FIG. 3 shows a schematic diagram of an illustrative single or multi-chip module of this invention in a data processing system. Device 300 may include single or multi-chip module 302, which can be one or more integrated circuits, and which may include logic configured to: perform mathematical operations on signals representing signal noise power or to perform any other suitable logical operations. Device 304 may include one or more of the following components: I/O circuitry 304, which may interface with coaxial cable, telephone lines, wireless devices, output devices, a keypad/display control device or any other suitable media or devices; peripheral devices 306, which may include counter timers, real-time timers, power-on reset generators or any other suitable peripheral devices; processor 308, which may control process flow; and memory 310. Components 302, 304, 306, 308 and 310 may be coupled by a system bus or other interconnections 312 and may be present on one or more circuit boards such as 320. In some embodiments, the components may be integrated into a single chip.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for restoring an operational state of a portable handheld device have been provided. Persons skilled in the art will appreciate that the present invention can be practiced by other than the described embodiments, which are presented for purposes of illustration rather than of limitation, and the present invention is limited only by the claims which follow.

What is claimed is:

1. A process for restoring an operational state of a portable handheld device, the device having multiple computing units and persistent storage, the process comprising:
   receiving user input that generates a sequence of events corresponding to the operational state, the events being categorized into a plurality of event types;
   selecting an event type for storage;
   after receiving the user input, storing in the persistent storage events, from among the sequence of events, corresponding to the selected event type;
   receiving a signal indicating an interruption of operation; and
   transmitting the stored events to restore the device to a pre-defined reference operational state;
   wherein:
   the stored events comprise a part and not all of the sequence of events; and
   the event types include:
      a session start event type;
      a session end event type;
      a request for a Universal Resource Locator;
      a user key-press; and
      a menu pull-down instruction.

2. The process of claim 1 wherein the event types include:
   a major event type; and
   a minor event type.

3. The process of claim 1 further comprising providing a removable battery for the portable handheld device.

4. The process of claim 1 wherein the transmitting comprises broadcasting to multiple computing units that are:
   physically in one silicon die; and
   logically connected through shared memory.

5. The process of claim 1 wherein the transmitting comprises broadcasting to multiple computing units that are:
   physically in one silicon die; and
   logically connected through a shared bus.

6. The process of claim 1 wherein the transmitting comprises broadcasting to multiple computing units that are:
   physically in multiple silicon dies, the dies being in a single IC package; and
   logically connected through shared memory.

7. The process of claim 1 wherein the transmitting comprises broadcasting to multiple computing units that are:
   physically in multiple IC packages; and
   logically connected through a shared bus.

8. The process of claim 1 wherein the storing comprises storing by operation of a centralized event handler.

9. The process of claim 1 wherein:
   the operational state includes the operation of at least a first application and a second application;
   the sequence of events includes a first subsequence corresponding to the first application and a second subsequence corresponding to the second application;
   the first application stores the first subsequence in a first portion of the persistent storage; and
   the second application stores the second subsequence in the second portion of the persistent storage.

10. The process of claim 9 wherein the first and second portions of the persistent storage are physically separated from each other.

11. The process of claim 9 wherein the first and second portions of the persistent storage are logically separated from each other.

12. A portable handheld device including an operational state, the device comprising:
   a memory for maintaining data integrity through an OFF/ON power cycle and for storing events that correspond to a selected one of the plurality of event types;
   an input device configured to receive user input that generates a sequence of events corresponding to the operational state, the operational state that receives signals corresponding to a plurality of event types;
   a signal processor for receiving a signal indicating an interruption of operation; and
   a transmitting module that transmits, the stored events in order to restore the device to a pre-defined reference operational state;
   wherein:
      the events are stored in the memory after the input device has received the user input that generates a sequence of events corresponding to the operational state;
      the stored events comprise a part and not all of the sequence of events; and
      the event types include:
         a session start event type;
         a session end event type;
         a request for a Universal Resource Locator;
         a user key-press; and
         a menu pull-down instruction.

13. The device of claim 12 wherein the event types include:
   a major event type; and
   a minor event type.

14. The device of claim 12 further comprising providing a removable battery.

15. The device of claim 12 further comprising multiple computing units, the units that are physically located in one silicon die and logically connected through shared memory.

16. The device of claim 12 further comprising multiple computing units that are physically in one silicon die and logically connected through a shared bus.

17. The device of claim 12 further comprising multiple computing units that are physically in multiple silicon dies, the dies being in a single IC package, and logically connected through shared memory.

18. The device of claim 12 further comprising multiple computing units that are physically in multiple IC packages and logically connected through a shared bus.

19. The device of claim 12 further comprising a centralized event handler module.

20. The device of claim 12 wherein the operational state, comprises a first application and a second application, the events include a first event corresponding to the first application and a second event corresponding to the second application, the first application that stores the first event in a first portion of the memory, and the second application that stores the second event in the second portion of the persistent storage.

21. The device of claim 20 wherein the first and second portions of the persistent storage are physically separated from each other.

* * * * *